United States Patent

Carsello et al.

[11] Patent Number: 5,872,819
[45] Date of Patent: Feb. 16, 1999

[54] METHOD AND APPARATUS FOR FACILITATING SYMBOL TIMING ACQUISITION IN A DATA COMMUNICATION RECEIVER

[75] Inventors: Stephen Rocco Carsello, Forth Worth; Leo G. Dehner, Southlake, both of Tex.

[73] Assignee: Motorola, Inc., Schaumburg, Ill.

[21] Appl. No.: 803,049

[22] Filed: Feb. 19, 1997

[51] Int. Cl.[6] .............................. H04L 4/00; H03D 3/24
[52] U.S. Cl. ........................................ 375/355; 375/376
[58] Field of Search ................................ 375/355, 371, 375/360, 373, 287, 293, 294, 376

[56] References Cited

U.S. PATENT DOCUMENTS

| | | | |
|---|---|---|---|
| 4,339,823 | 7/1982 | Predina et al. | 375/293 |
| 5,121,411 | 6/1992 | Fluharty | 375/293 |
| 5,486,867 | 1/1996 | Hsu et al. | 375/294 |
| 5,521,941 | 5/1996 | Wiatrowski et al. | 375/287 |

OTHER PUBLICATIONS

Masahiko Hirono, Toshio Miki, and Kazuaki Murota, "Multilevel Decision Method for Band–Limited Digital FM with Limiter–Discriminator Detection", IEEE Transactions on Vehicular Technology, vol. VT–33, No. 3, pp. 1141–122, Aug. 1984, USA.

*Primary Examiner*—Temesghen Ghebretinsae
*Assistant Examiner*—Albert C. Park
*Attorney, Agent, or Firm*—R. Louis Breeden

[57] ABSTRACT

A method and apparatus samples (902) a currently received symbol to form sampled values corresponding to sampling times, and evaluates (904) the currently received symbol to determine (906) its value. The method and apparatus recalls (908) a last previously received symbol and selects (916), from a plurality of thresholds (302), a threshold based upon the currently received symbol and the last previously received symbol. The threshold is known to be crossed consistently midway in time between the centers of two adjacent nominal symbols determined by the currently received symbol and the last previously received symbol. The sampled values are compared (920) to locate two adjacent samples, one having a first sampled value greater than the threshold and one having a second sampled value less than or equal to the threshold. A timing phase error is then computed (922, 924) from the first and second sampled values.

18 Claims, 5 Drawing Sheets

METHOD AND APPARATUS FOR FACILITATING SYMBOL TIMING ACQUISITION IN A DATA COMMUNICATION RECEIVER

FIELD OF THE INVENTION

This invention relates in general to data communication receivers, and more specifically to a method and apparatus for facilitating symbol timing acquisition in a data communication receiver.

BACKGROUND OF THE INVENTION

A data communications receiver requires a symbol synchronizer for adjusting the sampling instant at which symbol decisions are made. In a radio data communication receiver, the symbol synchronizer must be resistant to noise and simulcast delay distortion, while, at the same time, it must be capable of tracking out large timing drifts associated with crystal oscillator error over long data frames. In general, there is no definitive "optimum" clock recovery technique, as the best choice of symbol synchronizer is a strong function of the pulse shaping that is used in the end-to-end system and the number of digital signal levels in the case of M-ary signaling.

In simulcast paging systems, for example, pulse shaping is usually kept "loose" in the frequency domain by using, for example, Bessel filtering on both the transmit (premodulation filter) and receive (post-detection filter) ends, so that the demodulated eye exhibits a wide eye opening. Using such pulse shaping, it can be shown that, for a 2-level case, the zero-crossings provide ideal timing information, making the traditional zero-crossing PLL used in prior art receivers appropriate for symbol synchronization. The general M-ary case (with M>2), however, exhibits jitter in its zero-crossings, making the zero-crossing PLL used in many prior art 4-level receivers, for example, sub-optimum.

Other prior art techniques have reduced the zero-crossing jitter by allowing timing information to be obtained for only "usable" symbol transitions, i.e., those transitions that produce no zero-crossing jitter. Such techniques can allow excessive timing drift and increased bit error rate when the received data includes too many contiguous non-usable symbol transitions.

Thus, what is needed is a method and apparatus for facilitating symbol timing acquisition in a data communication receiver. Preferably, the method and apparatus will overcome the above described prior art deficiencies for the general M-ary case and will provide a new, jitter-free timing phase error measurement.

SUMMARY OF THE INVENTION

An aspect of the present invention is a method for facilitating symbol timing acquisition in a data communication receiver. The method comprises the steps of sampling a currently received symbol to form a plurality of sampled values corresponding to a plurality of sampling times, and evaluating the currently received symbol to determine its value. The method further comprises the steps of recalling a last previously received symbol; and selecting, from a plurality of thresholds, a threshold based upon the currently received symbol and the last previously received symbol, the threshold being computed as a midpoint between nominal levels determined by the currently received symbol and the last previously received symbol, wherein the threshold is known to be crossed consistently midway in time between centers of the currently received symbol and the last previously received symbol. The method also includes the steps of comparing the plurality of sampled values to locate two adjacent samples, one having a first sampled value greater than the threshold and one having a second sampled value less than or equal to the threshold; and computing a timing phase error from the first and second sampled values.

Another aspect of the present invention is an apparatus for facilitating symbol timing acquisition in a data communication receiver. The apparatus comprises a sampler for sampling a currently received symbol to form a plurality of sampled values corresponding to a plurality of sampling times, the currently received symbol having a symbol center, and a current symbol decider coupled to the sampler for evaluating the currently received symbol to determine its value. The apparatus further comprises a storage element coupled to the current symbol decider for storing a last previously received symbol, and a timing acquisition element for facilitating symbol timing acquisition. The timing acquisition element comprises a threshold selector for selecting, from a plurality of thresholds, a threshold based upon the currently received symbol and the last previously received symbol, the threshold being computed as a midpoint between nominal levels determined by the currently received symbol and the last previously received symbol, wherein the threshold is known to be crossed consistently midway in time between centers of the currently received symbol and the last previously received symbol; and a comparator coupled to the sampler and coupled to the selector for comparing the plurality of sampled values to locate two adjacent samples, one having a first sampled value greater than the threshold and one having a second sampled value less than or equal to the threshold. The apparatus also includes an error calculator coupled to the comparator and coupled to the sampler for computing a timing phase error from the first and second sampled values.

Another aspect of the present invention is a data communication receiver, comprising an antenna for intercepting a radio signal comprising a data message, and a receiver front end coupled to the antenna for down-converting and demodulating the radio signal to derive a plurality of analog symbols representing the data message. The data communication receiver further comprises a converter coupled to the receiver front end for converting the plurality of analog symbols into a plurality of digital bits, and a processor coupled to the converter for processing the plurality of digital bits to derive the data message. The data communication receiver further comprises a user interface coupled to the processor for conveying the data message to a user of the data communication receiver. The converter comprises a sampler for sampling a currently received symbol to form a plurality of sampled values corresponding to a plurality of sampling times, the currently received symbol having a symbol center; and a current symbol decider coupled to the sampler for evaluating the currently received symbol to determine its value. The converter also includes a storage element coupled to the current symbol decider for storing a last previously received symbol, and a timing acquisition element for facilitating symbol timing acquisition. The timing acquisition element comprises a threshold selector for selecting, from a plurality of thresholds, a threshold based upon the currently received symbol and the last previously received symbol, the threshold being computed as a midpoint between nominal levels determined by the currently received symbol and the last previously received symbol, wherein the threshold is known to be crossed consistently midway in time between centers of the currently received symbol and the last previously received symbol. The timing acquisition element further comprises a comparator coupled to the sampler and coupled to the selector for comparing the plurality of sampled values to locate two adjacent samples, one having a first sampled value greater than the threshold and one having a second sampled value less than or equal to the threshold; and an error calculator coupled to the comparator and coupled to the sampler for computing a timing phase error from the first and second sampled values.

DETAILED DESCRIPTION OF THE DRAWINGS

Figure 1:
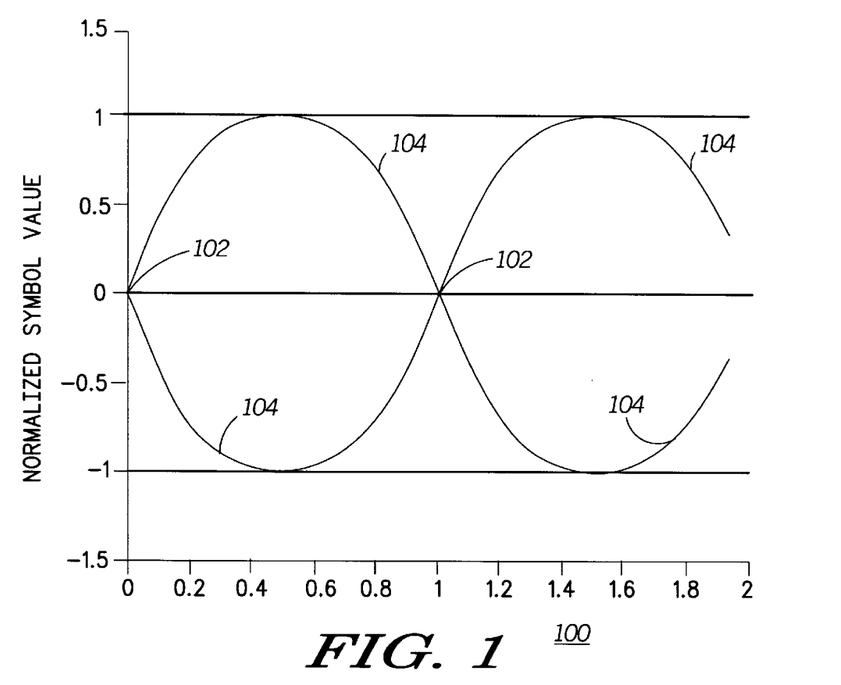
FIG. 1 is an eye diagram for a case of wide pulse shaped binary symbols.

Referring to FIG. 1, an eye diagram 100 is depicted for the case of wide pulse shaped binary symbols 104. Note that the zero-crossings 102 provide ideal timing information, making a traditional zero-crossing PLL used in prior art receivers appropriate for symbol synchronization for wide pulse shaped binary symbols.

Figure 2:
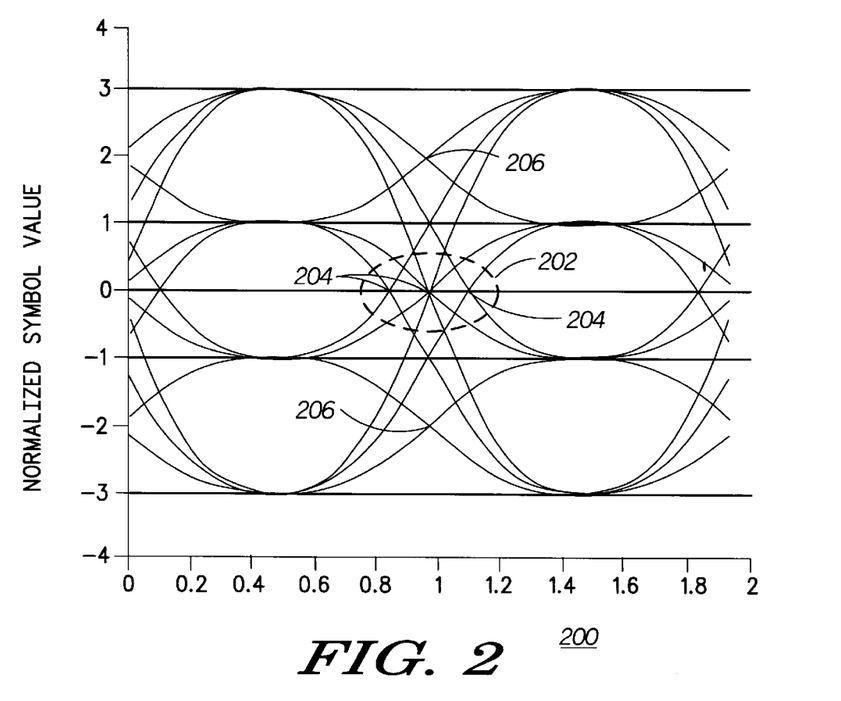
FIG. 2 is an eye diagram for a case of wide pulse shaped 4-ary symbols.

Referring to FIG. 2, an eye diagram 200 is depicted for a case of wide pulse shaped 4-ary symbols. Note that the 4-level case exhibits jitter 202 in its zero-crossings 204, and that some symbol transitions 206 do not cross zero at all, making the zero-crossing PLL used in many prior art receivers sub-optimum. From the eye diagram 200, one of ordinary skill in the art will appreciate that zero-crossing jitter and omitted zero crossings are present in the general M-ary case whenever M is greater than 2.

Figure 3:
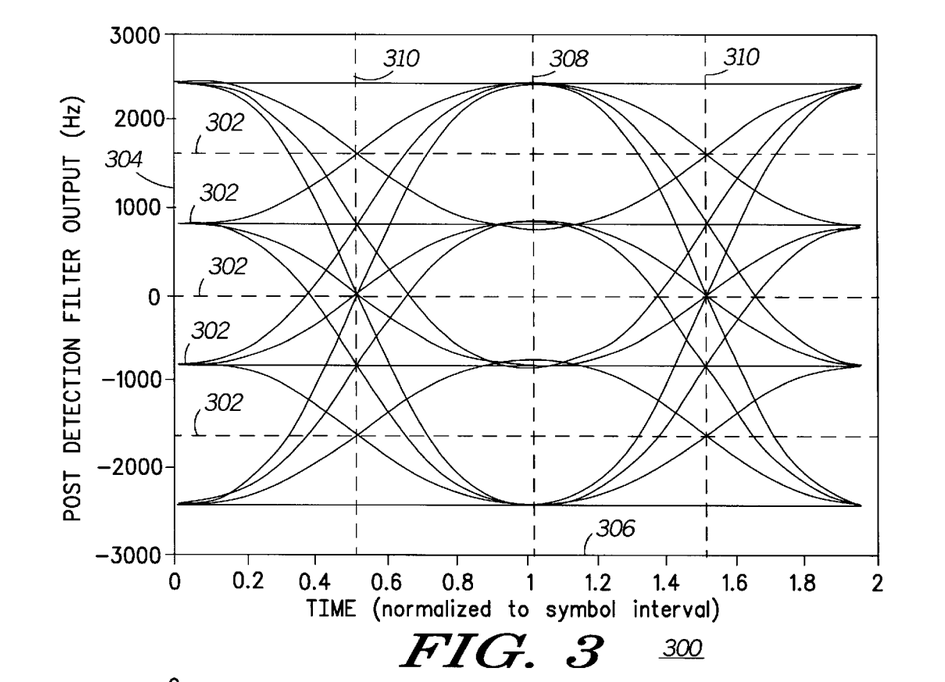
FIG. 3 is an eye diagram for the case of wide pulse shaped 4-ary symbols depicting symbol-crossing thresholds in accordance with the present invention.

Referring to FIG. 3, an eye diagram 300 for the case of wide pulse shaped 4-ary symbols depicts symbol-crossing thresholds 302 in accordance with the present invention. The vertical axis 304 represents the post-detection filter (PDF) output 714 of the data communication receiver 700 (FIG. 7) expressed in Hz. The horizontal axis 306 represents time. Also shown by vertical dashed lines are the symbol center 308 and "edges" 310 at plus and minus half a symbol period from the symbol center 308.

A key property that results when loose filtering is used is that the time of the symbol edge 310 coincides with a predictable level-crossing threshold 302 at a midpoint between any two adjacent symbols. For example, when transitioning from a +2400 Hz symbol to a +800 Hz symbol, the symbol edge 310 coincides with a level-crossing at +1600 Hz. In accordance with the present invention, every time a symbol transition is detected, a search is done for a selected threshold-crossing, the selection based upon the currently received symbol and the last previously received symbol. This technique advantageously eliminates timing jitter, because the selected threshold 302 is known to be crossed consistently midway in time between the centers of two adjacent nominal symbols determined by the currently received symbol and the last previously received symbol. An equivalent, and preferable, approach is to offset the PDF output samples by the selected threshold and search for a zero-crossing.

Figure 7:
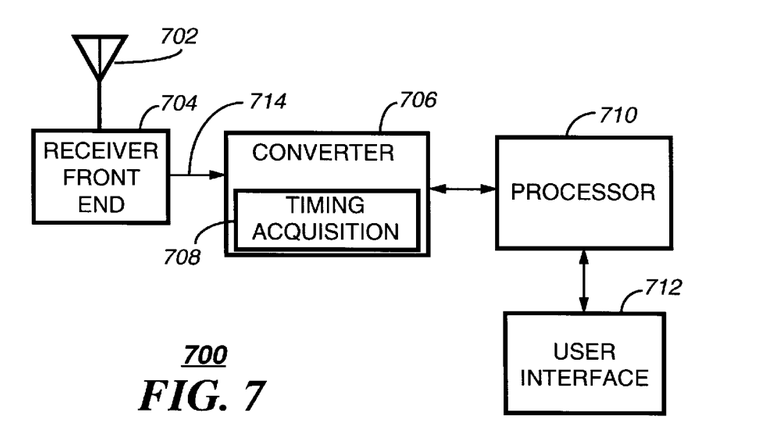
FIG. 7 is an electrical block diagram of a data communication receiver in accordance with the present invention.

Given an over-sampling rate of N samples per symbol, a fractionally-spaced loop is implemented with a small over-sampling rate (e.g., N=5 samples per symbol), as opposed to the traditional scheme which uses a much higher over-sampling rate (N=16). Given that n new samples are available in the PDF output buffer 402 for the current symbol, the symbol center as currently timed by the data communication receiver 700 (FIG. 7) is defined as time $$t_c = n - 1 + \tau,$$

where $\tau$ is a fractional slicing factor used to linearly interpolate between samples.

The first step that must be performed is to decide which symbol was just received. Given the two newest samples $Y_{(n-1)}$ and $Y_n$, a "decision statistic" is formed by linearly interpolating between the received samples. That is, the converter 706 (FIG. 7) uses the quantity $$z = (1-\tau) \times y_{(n-1)} + \tau \times y_n$$

so that, when $\tau$ is close to zero, the next most recent sample $Y_{(n-1)}$ is weighted the most, and as $\tau$ approaches one, the most recent sample $y_n$ is weighted the most. The quantity z is then compared to the symbol decision thresholds in a manner well known in the art, so that the most recent symbol can be determined. Once the symbol has been determined, the converter 706 converts the symbol into digital bits which uniquely represent the symbol value determined. For example, the bit combinations 11, 10, 00, and 01 can uniquely represent the four symbol values utilized in 4-ary modulation.

The threshold for the symbol edge crossing search is selected based on the current symbol decision and the last previous symbol decision. Preferably, the threshold is computed as the mean of nominal symbol values corresponding to the current and last previous symbols. It will be appreciated that, alternatively, the threshold can be selected through a look-up table containing possible symbol combinations and corresponding thresholds.

Figure 4:
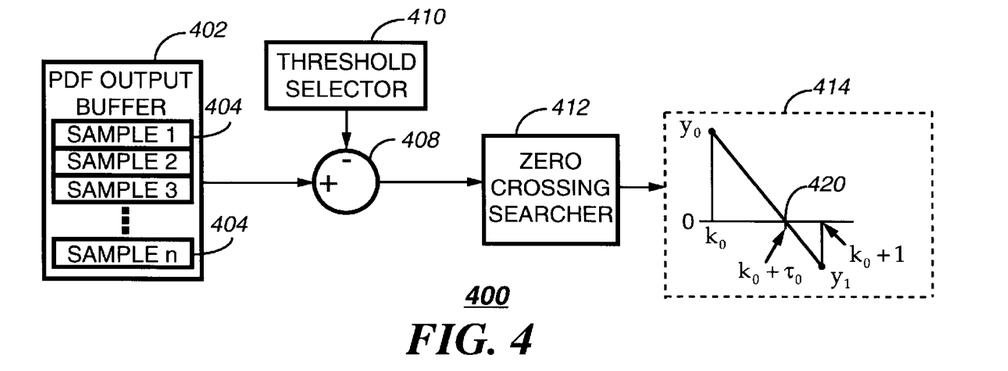
FIG. 4 is a diagram illustrating an exemplary technique for a fractionally-spaced threshold-crossing search in accordance with the present invention.

Referring to FIG. 4, a diagram 400 illustrates an exemplary technique for a fractionally-spaced threshold-crossing search in accordance with the present invention. The diagram 400 includes a PDF output buffer 402 containing n samples 404 of the most recently received symbol. The PDF output buffer 402 is coupled to an offsetter 408 for offsetting the sampled values by the threshold for the symbol edge crossing as selected by a threshold selector 410. The offset sampled values are searched by a zero-crossing searcher 412, using well known zero-crossing techniques, to locate two adjacent samples, one having a value greater than the threshold and one having a value less than or equal to the threshold. The two adjacent samples and corresponding sample values are then further processed by the interpolator 414 as described below.

For example, if a zero-crossing 420 is detected in the offset PDF output between samples $k_0$ and $k_0+1$, where the offset PDF outputs at times $k_0$ and $k_0+1$ are given by $y_0$ and $y_1$ respectively, then the exact time of the threshold-crossing can be approximated using linear interpolation $$\tau_0 = \frac{|y_0|}{|y_1 - y_0|}.$$

The timing phase error $\theta_e$ is then given by $$\theta_e = t_c - (k_0 + \tau_0) - \frac{N}{2},$$

where N is the number of PDF output samples per symbol (e.g., 5). If a positive phase error is detected, the symbol clock is late, and the PDF output will be sampled earlier on the next symbol. Similarly, if a negative phase error is detected, the symbol clock is early, and the PDF output will be sampled later on the next symbol.

Figure 5:
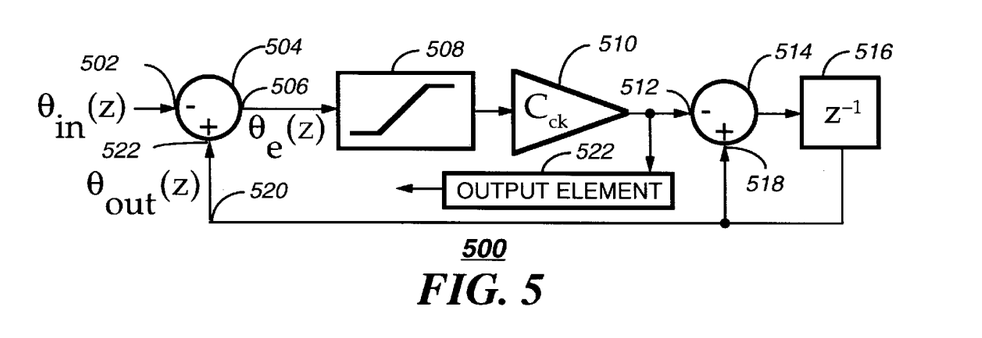
FIG. 5 is an electrical block diagram of an exemplary discrete-time phase locked loop (PLL) in accordance with the present invention.

Referring to FIG. 5, an electrical block diagram depicts an exemplary discrete-time phase locked loop (PLL) 500 in accordance with the present invention. The sampling frequency utilized by the PLL 500 is equal to the symbol rate, and one update is made per symbol. Assuming that there is always a symbol edge, which is usually the case when decoding four-level data, and that the phase error detector is linear, which is valid under strong signal conditions, the phase error term is given by $$\theta_e(z) = \theta_{out}(z) - \theta_{in}(z).$$

The PLL 500 comprises a first subtracter 504 having a subtracting input 502 coupled to $\theta_{in}(z)$ and having an adding input coupled to $\theta_{out}(z)$ for calculating the timing phase error $\theta_e(z)$ at an output 506 by subtracting $\theta_{in}(z)$ from $\theta_{out}(z)$.

The output of the PLL 500, $\theta_{out}(z)$, is the phase at which the timing acquisition element 708 currently deems the symbol center to be located, i.e., the phase used for detecting the current symbol. The measured phase, $\theta_{in}(z)$, is the phase where the symbol center should be located based on the currently measured symbol edge threshold crossing, i.e., $$\theta_{in}(z) = k_0 + \tau_0 + \frac{N}{2}.$$

The subtracter 504 is coupled to a limiter 508 for limiting the timing phase error $\theta_e(z)$ to a predetermined range, e.g., one-tenth of a symbol duration. The output of the limiter 508 is coupled to a feedback constant stage 510 for providing a feedback constant $C_{ck}$. The output of the feedback constant stage 510 is coupled to a subtracting input of a second subtracter 514 for subtraction from the loop output $\theta_{out}(z)$, which is coupled to an adding input 518 of the second subtracter 514. The signal at the output of the second subtracter 514 is coupled to a delay element 516 for delaying the signal by one symbol period to produce a modified timing phase $\theta_{out}(z)$ for use in the next subsequent symbol period.

The loop output is also related to the phase error according to $$\theta_{out}(z) = z^{-1}\{\theta_{out}(z) - C_{ck}\theta_e(z)\},$$

resulting in the closed-loop system function $$\frac{\theta_{out}}{\theta_{in}}(z) = \frac{C_{ck}}{z + C_{ck} - 1}.$$

Note that a pole occurs at $z=1-C_{ck}$, so that the condition for stability is $$0 \geq C_{ck} < 1.$$

The PLL 500 also includes an output element 522 for adjusting the timing of symbol sampling in accordance with the modified timing phase. Operation of the output element 522 is as follows.

Let $n_k$ new samples be available to the converter 706, where $n_k$ is to be defined by the output element to be either N−1, N, or N+1, dependent upon the timing phase of the incoming data. Define the expected symbol center time for symbol k to be $$t_{c,k} = n - 1 + \tau_k,$$

where $\tau_k$ is the fractional slicing factor. Given $\theta_e$ limited by the limiter 508, assume that $C_{ck}$ is small enough so that the update of the sampling phase, $-C_{ck} \times \theta_e$, never exceeds one sample in magnitude, i.e., $$|-C_{ck} \times \theta_e| < 1.0.$$

Then, for the next symbol, the fractional slicing factor will be $$\tau_{k+1} = (\tau_k - \theta\text{elim}C_{ck})\text{mod}1.0,$$

and the number of new samples to get for the next symbol is $$n_{k+1} = \begin{cases} N \text{ if } \tau_{k+1} \text{ does not wrap} \\ N + 1 \text{ if } \tau_{k+1} \text{ wraps positively} \\ N - 1 \text{ if } \tau_{k+1} \text{ wraps negatively} \end{cases}.$$

Figure 6:
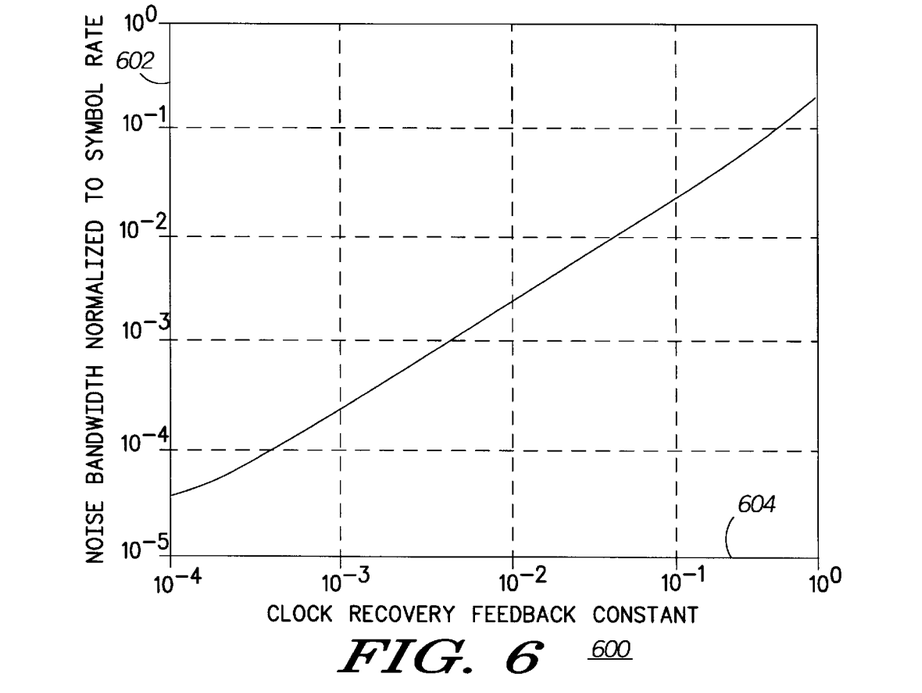
FIG. 6 is a performance diagram for the PLL in accordance with the present invention.

Referring to FIG. 6, a performance diagram is depicted for the PLL 500 in accordance with the present invention. On the vertical scale 602 the equivalent noise bandwidth, normalized to the symbol rate, of the closed-loop system is shown as a function of the feedback constant $C_{ck}$, represented by the horizontal scale 604. It is desirable to keep the loop bandwidth small relative to the symbol rate, so that noise introduced by the clock recovery circuit is smaller than noise at the PDF output 714. However, the closed-loop bandwidth must be large enough so that the PLL can track out crystal error which causes the timing to drift over the course of a data frame. For 100 parts per million crystal error, it is desirable to have $$100 \times 10^{-6} << \frac{B_n}{R_s} << 0.1,$$

where $B_n$ is the closed-loop noise bandwidth of the PLL 500 and $R_s$ is the symbol rate. For one embodiment of a receiver optimized for a member of Motorola's well-known FLEX® family of protocols, a good choice for $C_{ck}$ is: 0.25 during acquisition (A word search), 0.075 during Sync 1, 0.125 during Bit Sync 2, and 0.04 during block decoding.

Referring to FIG. 7, an electrical block diagram depicts the data communication receiver 700 in accordance with the present invention. The receiver 700 comprises an antenna 702 for intercepting a radio signal comprising a data message. The antenna 702 is coupled to a conventional receiver front end 704 for down-converting and demodulating the radio signal to derive a plurality of analog symbols representing the data message utilizing techniques well known in the art. The PDF output 714 of the data communication receiver 700 is coupled to the converter 706 for converting the plurality of analog symbols into a plurality of digital bits. The converter comprises a timing acquisition element 708 facilitating symbol timing acquisition in accordance with the present invention. The converter is further coupled to a conventional processor 710 for processing the plurality of digital bits to derive the data message. The processor 710 is also coupled to a conventional user interface 712, such as a liquid crystal display, for conveying the data message to a user of the data communication receiver 700.

Preferably, the functions of the converter 706 or any or all of the requisite elements, such as the timing acquisition element 708 and the PLL 500, are implemented in a digital signal processor executing software readily written by one of ordinary skill in the art, given the teachings of the instant disclosure. Alternatively, the converter 706 may be implemented all or in part as one or more integrated circuits. In particular the preferred embodiment uses a Motorola DSP56166 DSP. It will be appreciated that, alternatively, other processors can be utilized as well. It will be further appreciated that the processor utilized for the converter can be combined, entirely or in part, with the processor 710.

Figure 8:
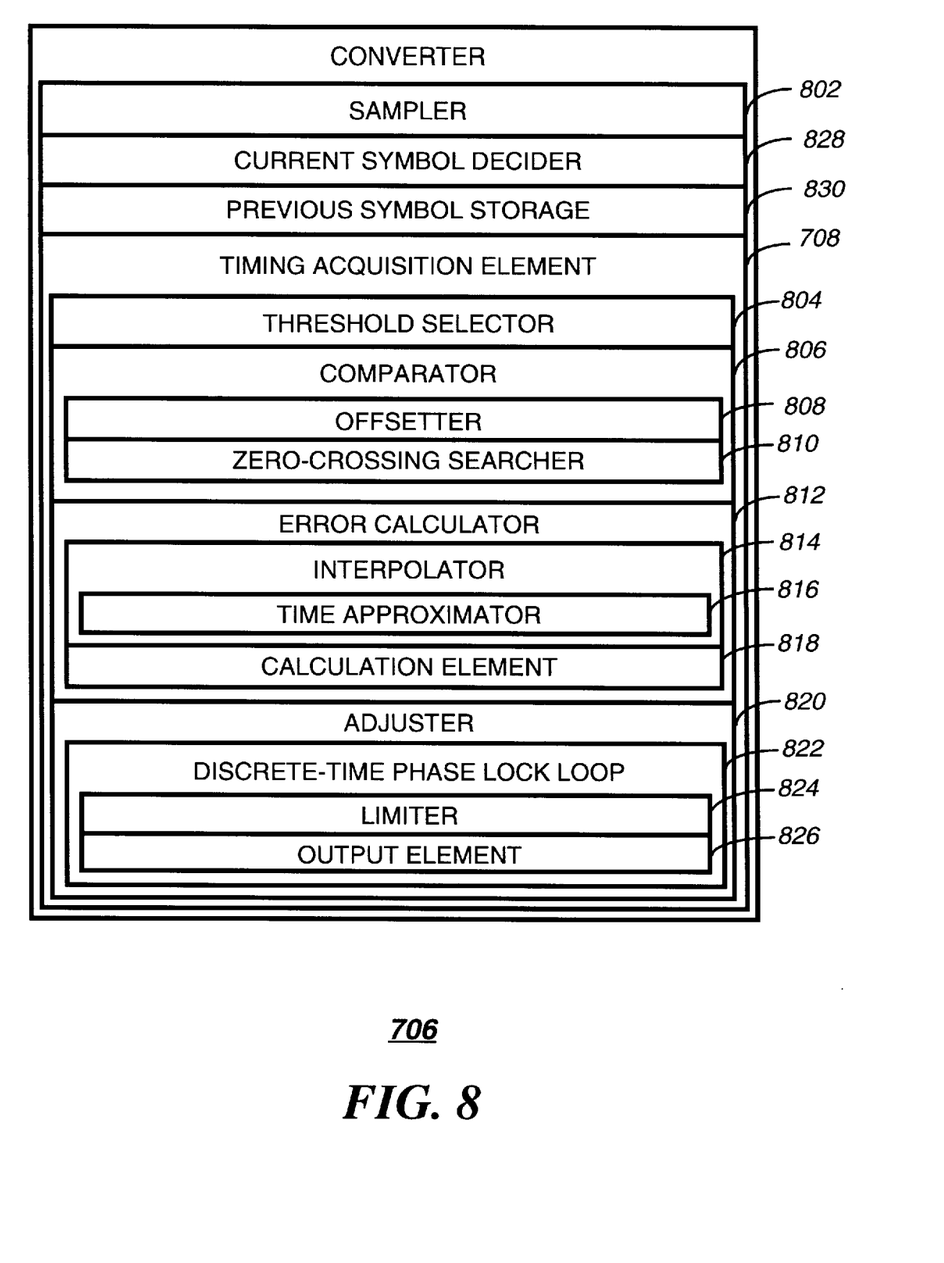
FIG. 8 is a block diagram depicting functional components of a converter in accordance with the present invention.

Referring to FIG. 8, a block diagram depicts functional components of the converter 706 in accordance with the present invention. In the preferred embodiment, a DSP executes the requisite techniques according to the present invention. As a DSP is programmed by software to perform the necessary calculations, the elements depicted in FIG. 8 preferably are software elements and memory elements. It will be appreciated that, alternatively, some or all of the elements of FIG. 8 can represent hardware for performing a similar function.

The converter 706 comprises a sampler 802 for sampling a currently received symbol to form a plurality of sampled values corresponding to a plurality of sampling times utilizing well-known techniques. The converter 706 further comprises a current symbol decider 828 for evaluating the currently received symbol to determine its value using techniques described herein above. The converter 706 also includes a storage element 830 for storing a last previously received symbol. In addition, the converter 706 includes the timing acquisition element 708. The timing acquisition element 708 comprises a threshold selector 804 for selecting, from a plurality of thresholds, a threshold based upon the currently received symbol and the last previously received symbol, as described herein above. The threshold is known to be crossed consistently midway in time between centers of two adjacent nominal symbols determined by the currently received symbol and the last previously received symbol. The timing acquisition element 708 further comprises a comparator 806 for comparing the plurality of sampled values to locate, using a well-known technique, two adjacent samples, one having a first sampled value greater than the threshold and one having a second sampled value less than or equal to the threshold. The comparator 806 comprises an offsetter 808 for offsetting the plurality of sampled values by the threshold. The comparator 806 further comprises a conventional zero-crossing searcher 810 for performing a zero-crossing search to locate the two adjacent samples.

The timing acquisition element further comprises an error calculator 812 for computing a timing phase error from the first and second sampled values. The error calculator 812 includes an interpolator 814 for performing an interpolation between the first and second sampled values to determine the timing phase error. The interpolator 814 comprises a time approximator 816 for approximating a time of the crossing of the threshold through a linear interpolation $$\tau_0 = \frac{|y_0|}{|y_1 - y_0|},$$

as described herein above. The error calculator 812 also includes a calculation element 818 for computing the timing phase error as equal to $$t_c - (k_0 + \tau_0) - \frac{N}{2},$$

where $t_c$ is a time corresponding to the symbol center as currently timed by the data communication receiver, and N represents the number of samples generated per symbol. The timing acquisition element further comprises an adjuster 820 for adjusting the timing of symbol sampling in response to the timing phase error. The adjuster 820 includes a discrete-time phase locked loop 822 for calculating a modified timing phase from the timing phase error. The discrete-time phase locked loop 822 comprises a limiter 824 for limiting the timing phase error to a predetermined range. The discrete-time phase locked loop 822 further comprises an output element 826 for adjusting the timing of symbol sampling in accordance with the modified timing phase, as described herein above.

Figure 9:
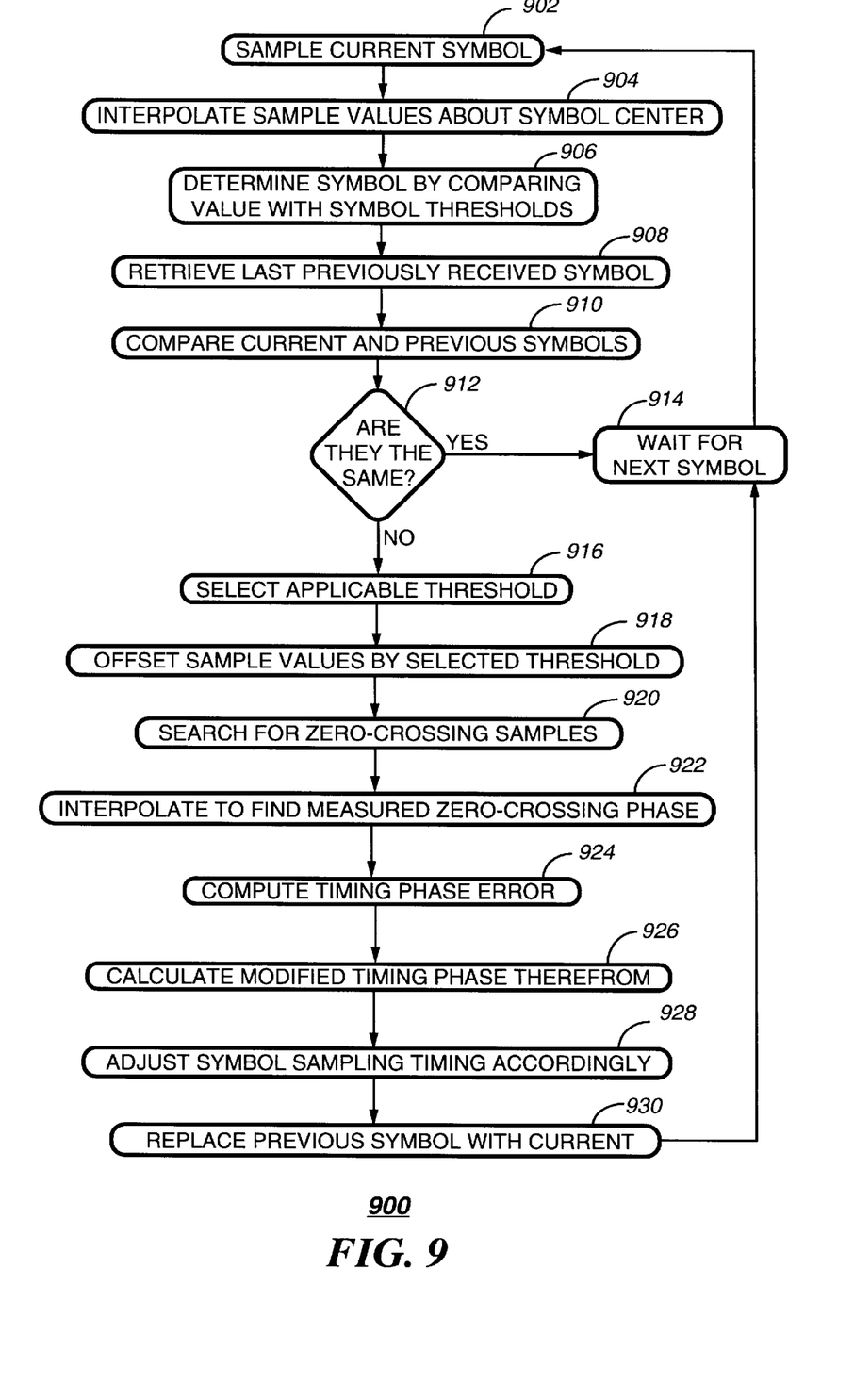
FIG. 9 is a flow diagram depicting operation of the converter in accordance with the present invention.

Referring to FIG. 9, a flow diagram depicts operation of the converter 706 in accordance with the present invention. The flow begins with the converter 706 sampling 902 a currently received symbol using well-known techniques. The converter 706 then interpolates 904 sample values on either side of the expected symbol center, as described herein above, to more accurately determine the symbol level. The converter 706 then compares the symbol level with the symbol thresholds to determine 906 which symbol was received. The converter then retrieves 908 the last previously received symbol from memory. The converter compares 910 the current and previous symbols. The converter 706 then checks 912 whether the two symbols are the same. If so, there is no symbol level transition to search for, and the converter 706 must wait 914 for a next symbol.

If, on the other hand, the current and previous symbols are different, the converter 706 selects 916 the applicable edge-crossing threshold, based on the current and previous symbols, as described herein above. The converter 706 then offsets 918 the sample values by the selected threshold, so that conventional zero-crossing techniques can be utilized to search 920 for two adjacent samples on either side of the zero crossing. The converter 706 linearly interpolates 922 the values corresponding to the zero-crossing samples, as described herein above, to more accurately determine the timing phase of the zero crossing. The converter 706 then computes 924 the timing phase error from the timing phase of the zero crossing, as described herein above. The converter 706 then calculates 926 a modified timing phase from the timing phase error and the currently used timing phase. The converter then adjusts 928 the symbol sampling timing according to the modified timing phase, as described herein above, and replaces 930 the previous symbol stored in the memory with the current symbol, for comparison with a next received symbol. Flow then returns to step 914 to wait for the next symbol.

Thus it should be apparent by now that the present invention provides a method and apparatus for facilitating symbol timing acquisition in a data communication receiver. The method and apparatus advantageously overcomes prior art deficiencies in timing acquisition for the general M-ary case and provides a new, jitter-free timing phase error measurement.

While the foregoing has disclosed by way of example an embodiment in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method for facilitating symbol timing acquisition in a data communication receiver, the method comprising the steps of:

sampling a currently received symbol to form a plurality of sampled values corresponding to a plurality of sampling times;

evaluating the currently received symbol to determine its value;

recalling a last previously received symbol;

selecting, from a plurality of thresholds, a threshold based upon the currently received symbol and the last previously received symbol, the threshold being computed as a midpoint between nominal levels determined by the currently received symbol and the last previously received symbol, wherein the threshold is known to be crossed consistently midway in time between centers of the currently received symbol and the last previously received symbol;

comparing the plurality of sampled values to locate two adjacent samples, one having a first sampled value greater than the threshold and one having a second sampled value less than or equal to the threshold; and computing a timing phase error from the first and second sampled values.

2. The method of claim 1, wherein the comparing step comprises the steps of:

offsetting the plurality of sampled values by the threshold; and performing a zero-crossing search to locate the two adjacent samples.

3. The method of claim 1, wherein the computing step comprises the step of performing an interpolation between the first and second sampled values to determine the timing phase error.

4. The method of claim 1, wherein a crossing of the threshold occurs between samples $k_0$ and $k_0+1$, and wherein the two adjacent samples corresponding to samples $k_0$ and $k_0+1$ have sample values of $y_0$ and $Y_1$, respectively, and wherein a time of the crossing of the threshold is approximated through a linear interpolation $$\tau_0 = \frac{|y_0|}{|y_1 - y_0|},$$

and wherein the computing step comprises the steps of computing the timing phase error as equal to $$t_c - (k_0 + \tau_0) - \frac{N}{2},$$

where $t_c$ is the symbol center as currently timed by the data communication receiver, and N represents how many samples are generated per symbol.

5. The method of claim 1, further comprising the step of adjusting a timing of symbol sampling in response to the timing phase error, including the steps of:

calculating a modified timing phase from the timing phase error, the modified timing phase calculated by a discrete-time phase locked loop; and adjusting the timing of symbol sampling in accordance with the modified timing phase.

6. The method of claim 5, wherein the step of calculating the modified timing phase comprises the step of limiting the timing phase error to a predetermined range.

7. An apparatus for facilitating symbol timing acquisition in a data communication receiver, the apparatus comprising:

a sampler for sampling a currently received symbol to form a plurality of sampled values corresponding to a plurality of sampling times, the currently received symbol having a symbol center;

a current symbol decider coupled to the sampler for evaluating the currently received symbol to determine its value;

a storage element coupled to the current symbol decider for storing a last previously received symbol; and a timing acquisition element for facilitating symbol timing acquisition, the timing acquisition element comprising:

a threshold selector for selecting, from a plurality of thresholds, a threshold based upon the currently received symbol and the last previously received symbol, the threshold being computed as a midpoint between nominal levels determined by the currently received symbol and the last previously received symbol, wherein the threshold is known to be crossed consistently midway in time between centers of the currently received symbol and the last previously received symbol;

a comparator coupled to the sampler and coupled to the selector for comparing the plurality of sampled values to locate two adjacent samples, one having a first sampled value greater than the threshold and one having a second sampled value less than or equal to the threshold; and an error calculator coupled to the comparator and coupled to the sampler for computing a timing phase error from the first and second sampled values.

8. The apparatus of claim 7, wherein the comparator comprises:

an offsetter for offsetting the plurality of sampled values by the threshold; and a zero-crossing searcher coupled to the offsetter for performing a zero-crossing search to locate the two adjacent samples.

9. The apparatus of claim 7, wherein the error calculator comprises an interpolator for performing an interpolation between the first and second sampled values to determine the timing phase error.

10. The apparatus of claim 9, wherein a crossing of the threshold occurs between samples $k_0$ and $k_0+7$, and wherein the two adjacent samples corresponding to samples $k_0$ and $k_0+1$ have sample values of $y_0$ and $y_1$, respectively, and wherein the interpolator comprises a time approximator for approximating a time of the crossing of the threshold through a linear interpolation $$\tau_0 = \frac{|y_0|}{|y_1 - y_0|},$$

and wherein the error calculator comprises a calculation element coupled to the time approximator for computing the timing phase error as equal to $$t_c - (k_0 + \tau_0) - \frac{N}{2},$$

where $t_c$ is a time corresponding to the symbol center as currently timed by the data communication receiver, and N represents how many samples are generated per symbol.

11. The apparatus of claim 7, further comprising an adjuster for adjusting a timing of symbol sampling in response to the timing phase error, the adjuster comprising:
   a discrete-time phase locked loop coupled to the error calculator for calculating a modified timing phase from the timing phase error, the discrete-time phase locked loop comprising
      an output element for adjusting the timing of symbol sampling in accordance with the modified timing phase.

12. The apparatus of claim 11, wherein the discrete-time phase locked loop further comprises
   a limiter for limiting the timing phase error to a predetermined range.

13. A data communication receiver, comprising:
   an antenna for intercepting a radio signal comprising a data message;
   a receiver front end coupled to the antenna for down-converting and demodulating the radio signal to derive a plurality of analog symbols representing the data message;
   a converter coupled to the receiver front end for converting the plurality of analog symbols into a plurality of digital bits;
   a processor coupled to the converter for processing the plurality of digital bits to derive the data message; and
   a user interface coupled to the processor for conveying the data message to a user of the data communication receiver,
   wherein the converter comprises:
      a sampler for sampling a currently received symbol to form a plurality of sampled values corresponding to a plurality of sampling times, the currently received symbol having a symbol center;
      a current symbol decider coupled to the sampler for evaluating the currently received symbol to determine its value;
      a storage element coupled to the current symbol decider for storing a last previously received symbol; and
      a timing acquisition element for facilitating symbol timing acquisition, the timing acquisition element comprising:
         a threshold selector for selecting, from a plurality of thresholds, a threshold based upon the currently received symbol and the last previously received symbol, the threshold being computed as a midpoint between nominal levels determined by the currently received symbol and the last previously received symbol, wherein the threshold is known to be crossed consistently midway in time between centers of the currently received symbol and the last previously received symbol;
         a comparator coupled to the sampler and coupled to the selector for comparing the plurality of sampled values to locate two adjacent samples, one having a first sampled value greater than the threshold and one having a second sampled value less than or equal to the threshold; and
         an error calculator coupled to the comparator and coupled to the sampler for computing a timing phase error from the first and second sampled values.

14. The data communication receiver of claim 13, wherein the comparator comprises:
   an offsetter for offsetting the plurality of sampled values by the threshold; and
   a zero-crossing searcher coupled to the offsetter for performing a zero-crossing search to locate the two adjacent samples.

15. The data communication receiver of claim 13, wherein the error calculator comprises
   an interpolator for performing an interpolation between the first and second sampled values to determine the timing phase error.

16. The data communication receiver of claim 15,
   wherein a crossing of the threshold occurs between samples $k_0$ and $k_0+13$, and
   wherein the two adjacent samples corresponding to samples $k_0$ and $k_0+1$ have sample values of $y_0$ and $y_1$, respectively, and
   wherein the interpolator comprises a time approximator for approximating a time of the crossing of the threshold through a linear interpolation $$\tau_0 = \frac{|y_0|}{|y_1 - y_0|},$$

and wherein the error calculator comprises a calculation element coupled to the time approximator for computing the timing phase error as equal to $$t_c - (k_0 + \tau_0) - \frac{N}{2},$$

where $t_c$ is a time corresponding to the symbol center as currently timed by the data communication receiver, and N represents how many samples are generated per symbol.

17. The data communication receiver of claim 13, wherein the timing acquisition element further comprises an adjuster for adjusting a timing of symbol sampling in response to the timing phase error, the adjuster comprising:
   a discrete-time phase locked loop coupled to the error calculator for calculating a modified timing phase from the timing phase error, the discrete-time phase locked loop comprising
      an output element for adjusting the timing of symbol sampling in accordance with the modified timing phase.

18. The data communication receiver of claim 17, wherein the discrete-time phase locked loop further comprises
   a limiter for limiting the timing phase error to a predetermined range.

* * * * *